US011674113B2

(12) United States Patent
Morschhäuser et al.

(10) Patent No.: US 11,674,113 B2
(45) Date of Patent: Jun. 13, 2023

(54) CO-GRANULES, DETERGENTS AND CLEANING AGENTS AND USE THEREOF

(71) Applicant: WeylChem Performance Products GmbH, Wiesbaden (DE)

(72) Inventors: Roman Morschhäuser, Mainz (DE); Judith Preuschen, Sörgenloch (DE); Bo Kuhse, Wiesbaden (DE); Rolf Ludwig, Eppstein (DE)

(73) Assignee: Weylchem Performance Products, GMBH, Wiesbaden (DE)

( * ) Notice: Subject to any disclaimer, the term of this patent is extended or adjusted under 35 U.S.C. 154(b) by 33 days.

(21) Appl. No.: 17/193,022

(22) Filed: Mar. 5, 2021

(65) Prior Publication Data

US 2021/0277333 A1    Sep. 9, 2021

(30) Foreign Application Priority Data

Mar. 6, 2020    (DE) .................. 10 2020 001 458.5

(51) Int. Cl.
| | |
|---|---|
| *C11D 3/39* | (2006.01) |
| *C11D 3/34* | (2006.01) |
| *C11D 3/30* | (2006.01) |
| *C11D 3/22* | (2006.01) |
| *C11D 11/00* | (2006.01) |
| *C11D 3/48* | (2006.01) |

(52) U.S. Cl.
CPC .......... *C11D 3/3917* (2013.01); *C11D 3/222* (2013.01); *C11D 3/225* (2013.01); *C11D 3/30* (2013.01); *C11D 3/349* (2013.01); *C11D 3/3935* (2013.01); *C11D 3/3942* (2013.01); *C11D 3/48* (2013.01); *C11D 11/0017* (2013.01)

(58) Field of Classification Search
CPC ......... C11D 3/3454; C11D 3/349; C11D 3/30; C11D 3/2082
See application file for complete search history.

(56) References Cited

U.S. PATENT DOCUMENTS

| | | | | |
|---|---|---|---|---|
| 5,041,232 A | * | 8/1991 | Batal ................. | C11D 3/392 510/303 |
| 5,433,881 A | * | 7/1995 | Townend ............ | C11D 3/3902 510/318 |
| 2016/0152929 A1 | * | 6/2016 | Reinhardt .......... | C11D 17/0091 252/186.1 |
| 2018/0187130 A1 | * | 7/2018 | Barreleiro ........... | C11D 3/2082 |
| 2021/0277333 A1 | * | 9/2021 | Morschhäuser .... | C11D 11/0017 |

FOREIGN PATENT DOCUMENTS

| | | | | |
|---|---|---|---|---|
| DE | 69104405 | T2 | 2/1995 | |
| DE | 69104751 | T2 | 3/1995 | |
| EP | 0446982 | A2 | 3/1990 | |
| EP | 0453003 | A2 | 10/1991 | |
| EP | 3345989 | A1 | 7/2018 | |
| EP | 3406698 | A1 * | 11/2018 | ............ C11D 3/392 |
| EP | 3406698 | A1 | 11/2018 | |
| GB | 2331305 | A * | 5/1999 | ............ C11D 1/521 |
| WO | WO-2013188331 | A1 * | 12/2013 | ............ C11D 3/046 |
| WO | WO-2017156141 | A1 * | 9/2017 | ............ C11D 1/143 |

OTHER PUBLICATIONS

EP 346698 A1 English Translation. (Year: 2022).*
European Search Report dated Jul. 9, 2021.
G. Reinhardt, M. Best, I. Herrgen and M. Ladwig, Oxaziridines and Dioxiranes—Bleach Boosters for Domestic and Industrial Applications, SOFW-Journal 140, Sep. 2014.

* cited by examiner

*Primary Examiner* — Nicole M. Buie-Hatcher
*Assistant Examiner* — M. Reza Asdjodi
(74) *Attorney, Agent, or Firm* — Michael Ferrell

(57) ABSTRACT

There are disclosed co-granules coated with hydroxymethyl cellulose and containing: b1) cyclic sulfonimine, b2) bleach activator selected from the group consisting of tetraacetylethylenediamine, decanoyloxybenzoic acid or mixtures thereof, and b3) carboxymethyl cellulose as binder, wherein the binder consists of the carboxymethyl cellulose of component b)3 which has a solubility of at least 1 g of carboxymethyl cellulose in 1 L of water at 25° C. and wherein the coating comprises hydroxymethyl cellulose in an amount of from 5 to 20 wt. % of the coated co-granules.

16 Claims, No Drawings

CO-GRANULES, DETERGENTS AND CLEANING AGENTS AND USE THEREOF

CLAIM FOR PRIORITY

This application is based on German Application No. 10 2020 001 458.5 filed Mar. 6, 2020, the priority of which is hereby claimed and the disclosure of which is incorporated herein by reference.

TECHNICAL FIELD

The present invention relates to co-granules, detergents and cleaning agents for textiles and surfaces as well as to a process for cleaning textiles and surfaces.

BACKGROUND

In order to achieve a bleaching effect, persalts such as perborates and percarbonates are added to detergents and cleaning agents. For activating these bleaching agents and in order to achieve a satisfactory bleaching effect when cleaning at temperatures of 60° C. and below, these agents usually contain in addition bleach activators or bleach catalysts.

Bleach activators and bleach catalysts are preferably used in the form of prefabricated granules. This is carried out on the one hand to increase their storage stability, but on the other hand also to ensure a homogeneous incorporation of minute catalyst quantities into the formulations.

Sulfonimines and their use in detergents and cleaning agents have already been described in the patent literature.

DE 691 04 405 T2 corresponding to EP 0 453 003 B1 discloses bleach compositions for detergents that contain 1 to 60 wt. % of a peroxygen compound, 0.05 to 10 wt. % of a selected sulfonimine and 0.5 to 50 wt. % of a surfactant.

In DE 691 04 751 T2 corresponding to EP 0 446 982 B1 bleach compositions are described, that contain 1 to 60 wt. % of a peroxygen compound, 0.05 to 10 wt. % of a selected sulfonimine and 0.1 to 40 wt. % of a bleaching precursor reacting with the peroxide anion. From this document bleach compositions are known, which are already effective at low temperatures. In the examples, combinations of sulfonimine with the bleach activator tetraacetylethylenediamine (TAED) and perborate and their effect on textiles prepared with tea stains are described. The bleaching agent operates at temperatures of 40° C.

G. Reinhardt, M. Best, I. Herrgen and M. Ladwig disclose in SOFW-Journal 140 9-2014 sulfonimines and quaternary iminium salts as novel bleach catalysts. These compounds serve as precursors of dioxiranes, oxaziridines and oxaziridinium salts, which already achieve in combination with percompounds an excellent bleaching effect at low concentrations. In this publication it is already proposed to use sulfonimines and quaternary iminium salts in the form of granules with other bleach activators, such as TAED or sodium nonanoyloxy benzene sulfonate (NOBS), and thereby also to use film-forming binders. However, often such granules are not sufficiently storage stable.

EP 3,345,989 A1 discloses granules containing sulfonimines or quaternary iminium salts and as a stabilizer an acidic solid at 25° C. These granules can be used to formulate detergents and cleaning agents, which can already be used at temperatures below 35° C.

Due to the tendency to reduce the average washing temperatures, there is a reduced bleaching performance of detergents. This is associated with a deterioration in the antimicrobial effect of these products. It is known that TAED together with percarbonate shows above 40° C. a very good anti-microbial effect. However, this decreases very significantly at lower temperatures. This can lead to a serious germ load at temperatures below 30° C. in washing machines, which requires the use of biocides.

SUMMARY OF INVENTION

Surprisingly, it was found that co-granules containing selected sulfonimine and selected bleach activator need selected binders for the production of stable co-granules by wet granulation. In EP 3,345,989 A1 the use of non-acid binders is generally proposed, whereby cellulose ethers are not explicitly mentioned as binders. In the examples of this document, microcrystalline cellulose was used, but this does not allow wet granulation. Surprisingly, it was found that with cellulose ethers as binders stable co-granules can be produced by wet granulation. In addition, all granules described in EP 3,345,989 A1 show a slight yellowness after storage. The co-granules of the present invention show no change in the shade of color even after prolonged storage.

In addition, it was found that the co-granules containing selected sulfonimine, selected bleach activator and special binder require a coating of selected material in order to be sufficiently stable in storage and not to tend to discoloration. In the examples of EP 3,345,989 A1 coatings made of cellulose ether are mentioned. In the general description of this document, still other coating agents, such as polyvinyl alcohol, are mentioned. It was found, however, that polyvinyl alcohol in combination with cellulose ether as binder yields only granules with a limited shelf life. Surprisingly, the co-granules of the invention coated with cellulose ethers are distinguished by a very high storage stability.

Surprisingly, it was also found that co-granules containing selected sulfonimines and selected bleach activators in combination with selected persalts already release peracetic acid at 20° C., which is responsible for anti-microbial properties. It was found that the sulfonimine needs the bleach activator and the persalt to become activated via peracid. If there is no or too little bleach activator, then the sulfonimine cannot become activated and cannot cause bleaching effects at 20° C. nor be microbiologically effective. In the co-granule, the bleach activator thus attains to the sulfonimine and activates the latter. The system sulfonimine, bleach activator and persalt thus ensures optimum hygiene even at low temperatures.

Starting from this prior art, the present invention was based on the object to provide co-granules which are storage-stable over long periods said co-granules containing highly active bleach activators and bleach catalysts, and do not tend to discoloration during storage.

A further object of the present invention was the provision of stable co-granules containing highly active bleach activators and bleach catalysts, which do not decay into their constituents after wet granulation.

Still another object of the present invention was the provision of co-granules, which in combination with selected bleaching agents allow excellent washing results at low temperatures and which cause a drastic reduction in the number of microorganisms on the treated substrates.

These objectives are solved by providing co-granules coated with cellulose ether said co-granules comprising
(b1) cyclic sulfonimine,
(b2) bleach activator selected from the group consisting of tetraacetylethylenediamine, decanoyloxybenzoic acid or mixtures thereof, and
(b3) cellulose ether as binder.

In addition, the invention relates to detergents and cleaning agents comprising
(a) bleaching agent selected from the group consisting of perborate, percarbonate or mixtures thereof, and
(b) co-granule coated with cellulose ether said co-granule containing
(b1) cyclic sulfonimine,
(b2) bleach activator selected from the group consisting of tetraacetylethylenedianine, decanoyloxybenzoic acid or mixtures thereof, and
(b3) cellulose ether as binder.

DETAILED DESCRIPTION

In the washing and cleaning agent according to the invention selected per-compounds are used as component a). These are perborate, percarbonate or mixtures thereof.

Preferably, as component a) the corresponding sodium salts of the perborates and percarbonates are used, in particular sodium percarbonate.

The amount of component a) in the washing and cleaning agent according to the invention is usually 5 to 30 wt. %, based on the total amount of detergent and cleaning agent. Preferred amounts of component a) are in the range of 5 to 20 wt.-%, especially in the range of 8 to 12 wt.-%.

In the washing and cleaning agent according to the invention as component b) co-granules with selected components are used. These co-granules are ensheated with a cellulose ether coating. These co-granules contain as ingredients b1) cyclic sulfonimine, b2) bleach activator selected from the group consisting of tetraacetylethylenedianine, decanoyloxybenzoic acid and mixtures thereof, and as a binder b3) cellulose ether.

The amount of component b) in the washing and cleaning agent according to the invention is usually 0.1 to 10 wt.-%, based on the total amount of detergent and cleaning agent. Preferred amounts of component b) are in the range of 0.2 to 8 wt.-%, in particular from 0.5 to 6 wt.-%, particularly preferred from 0.5 to 3 wt.-%, and most preferred in the range of 0.5 to 2 wt.-%.

The cyclic sulfonimines used as component b1) according to the invention are cyclic compounds with a structural unit =N—SO2- in the molecule.

Cyclic sulfonimines preferably used as component b1) are compounds of formula I

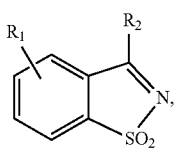

(I)

wherein $R_1$ and $R_2$ independently of one another are hydrogen, $C_1$-$C_6$-alkyl or phenyl.

Of the compounds of formula I those are particularly preferred, in which $R_1$ is hydrogen and $R_2$ is $C_1$-$C_6$-alkyl, in particular methyl or ethyl, or phenyl.

Very preferred sulfonimine of formula I is 3-methyl-1,2-benzisothiazole-1,1-dioxide.

If in this description one of the residues means $C_1$-$C_6$ alkyl, the alkyl group may be either branched or unbranched. An alkyl group contains one to six carbon atoms. Examples of alkyl groups are: methyl, ethyl, n-propyl, isopropyl, n-butyl, sec-butyl, tert.-butyl, pentyl or n-hexyl.

The amount of component b1) in the co-granulate according to the invention is usually 5 to 50 wt. %, based on the total amount of ensheated co-granules. Preferred amounts of component b1) are in the range of 15 to 45 wt.-%, especially in the range of 20 to 35 wt.-%.

As bleach activator b2) tetraacetylethylenediate or decanoyloxybenzoic acid are used according to the invention. Mixtures of these can also be used. Preferred component b2) is tetraacetylethylenediamine.

The amount of component b2) in the co-granule according to the invention is usually 20 to 75 wt.-%, based on the total amount of ensheated co-granules. Preferred amounts of component b2) are in the range of 40 to 70 wt.-%, especially in the range of 50 to 60 wt.-%.

As binder b3) a cellulose ether is used according to the invention. Mixtures of cellulose ethers can also be used.

Cellulose ethers are derivatives of cellulose, which are produced by partial or complete substitution of the hydrogen atoms of the hydroxy groups in the cellulose. Kind of substituents, number of substituted hydroxy groups and their distribution in the cellulose ethers used according to the invention can be varied in wide ranges. Preferably, cellulose ethers are used, which are soluble in water. This is understood to mean a solubility of at least 1 g of cellulose ether in 1 L of water of 25° C.

Examples of cellulose ethers that can be used as component b3) are carboxymethylcellulose (CMC), methyl cellulose (MC), ethyl cellulose (EC), hydroxyethyl cellulose (HEC) or hydroxypropyl cellulose (HPC).

Other examples of cellulose ethers that can be used as component b3) are mixed cellulose ethers, such as methyl ethyl cellulose (MEC), hydroxyethyl methyl cellulose (NEMC), hydroxypropyl methyl cellulose (HPMC), ethylhydroxyethyl cellulose or carboxymethyl hydroxyethylcellulose Preferred component b3) is carboxymethylcellulose.

The amount of component b3) in the co-granule according to the invention is usually 1 to 10 wt.-%, based on the total amount of ensheated co-granules. Preferred amounts of component b3) are in the range of 2 to 8 wt.-%, especially in the range of 3 to 6 wt-%.

The co-granules of the invention may contain still other ingredients as component b4) in addition to the above-described components b1), b2) and b3). The proportion of component b4) is usually 0 to 20 wt.-%, preferably 0 to 10 wt.-%, based on the total mass of the ensheated co-granule.

As other ingredients b4), for example, sikkatives, such as calcium sulfate, or other binders that are not cellulose ethers, or acidic components are a possibility. Combinations of several ingredients b4) can also be used. However, their total quantity should not exceed 20 wt-%, based on the total mass of the ensheated co-granule.

Preferably, the co-granules of the invention contain no further ingredients in addition to the components b1), b2) and b3) and the coating.

The co-granules of the invention are provided with a sheating of cellulose ether (so-called coating or protective layer), whereby the storage stability is improved and the co-granules can be optionally coloured. The proportion of the coating referring to the total amount of co-granules may vary in wide ranges, but should not exceed 30 wt.-%, based on the total mass of the ensheated co-granule. Preferably, the proportion of the coating is 5 to 20 wt.-%, based on the total mass of the coated co-granulate.

Cellulose ethers specified as component b3) can be used for the coating. As coating material, methyl cellulose, carboxymethyl cellulose, hydroxymethylpropyl cellulose, hydroxymethyl cellulose, hydroxypropyl cellulose or mixtures of two or more thereof are preferred. Optionally, the coating may additionally contain small amounts of additives, such as water-soluble or water-insoluble organic dyes and/or other film-forming polymers (i.e. film-forming polymers that are not cellulose ethers). However, the total proportion of such additives and/or other film-forming polymers in the total mass of the coating should not exceed 10 wt.-%, preferably 5 wt.-%. Preferably, the coating contains no additives and no further film-forming polymers.

In another embodiment, the co-granule of the invention may be provided with two or more coatings, of which at least one consists of cellulose ether. Thus, the co-granule of the invention may be provided with a first coating, preferably from hydroxypropyl methylcellulose (HPMC) and/or from methyl cellulose (MC), and with a second protective layer, preferably from a fatty acid or a fatty acid mixture, most preferably from stearic acid and palmitic acid.

Preferably used as coating material is hydroxymethyl cellulose.

In view of their performance and storage stability, co-granules coated with 5 to 20 wt.-% hydroxymethyl cellulose are particularly preferred, which, based on their total weight, contain b1) 20 to 35 wt.-% cyclic sulfonimine of formula (I),
b2) 50 to 60 wt.-% tetraacetylethylenediamine, and
b3) 3 to 6 wt.-% carboxymethylcellulose as binder.

For the preparation of the co-granules according to the invention, generally different granulation methods are possible.

Methods of build-up granulation and degradation granulation can be used. By degradation granulation, the skilled person understands the aggregation of powder by moisture or by pressure followed by a degradation by cutting to a desired grain size. The degradation granulation can be carried out as wet or dry granulation.

In the preferably used wet granulation, a dough-like, homogeneous mass is produced from the individual components and a granulation liquid, which is then crushed into the granules. As granulation liquids dissolved adhesives are used, wherein for the preparation of the co-granules of the invention cellulose ethers are used. The prepared base mass is then crushed to the co-granules, whereby aggregates known to the skilled person are used. A distinction can be made between perforated disc-, press- and shaking-granules. Finally, the solvents of the granulation liquids can be removed by heat treatment.

In dry granulation, co-granules are produced by compacting a powder by means of a pressure application. For this purpose, e.g. roller compactors may be used. The produced compressed material is then further reduced to the desired size.

In the also possible build-up granulation, the co-granules are produced directly from powder particles. For this purpose, for example, powder particles in an air flow in a fluidized bed apparatus can be swirled and sprayed with a granulating liquid. The powder particles accumulate into agglomerates, which are dried by the air flow. Alternatively, co-granules can be produced with high-speed mixers. For this purpose, the components of the co-granulate are introduced in powder form at the beginning of the process. During the duration of proceedings granulation liquid is added. Due to the high shear forces and the friction on the wall of the high-speed mixer, uniform co-granules are formed.

From the produced co-granules the fine grain portion and optionally the coarse grain portion can be separated by sieving. Preferably, the coarse grain portion is fed again into the granulating apparatus and the fine grain portion is fed again to the compaction.

The co-granules thus produced are provided with a coating in a separate step, for example in a fluidized bed mixer.

Characteristic of the co-granules according to the invention is primarily their chemical composition. Nevertheless, it has been shown that the effect of these co-granules can also be advantageously influenced by the manipulation of physical parameters, such as particle size, fine content as well as content of bleach catalyst and of bleach activator from selected sieve fractions.

For this reason preferred co-granules of the invention have an average particle size between 0.1 and 1.6 mm, preferably between 0.2 and 1.2 mm and more preferably between 0.3 and 1.0 mm, each measured by screen analysis.

In particularly preferred co-granules according to the invention, the volume mean size of the primary particles is in the range between 1 micron and 150 microns, and the finished co-granules have an average particle size between 0.1 and 1.6 mm.

Moreover, preferred co-granules according to the invention have a water content of less than 5 wt.-%, in particular of less than 2 wt.-% (measured according to Karl Fischer), based on the total amount of co-granule.

The co-granules are used for the preparation of the detergents or cleaning agents of the invention.

The detergents and cleaning agents of the invention may be present as granules, pulverulent or tablet-shaped solids but also in liquid or pasty form in pouches and 2-chamber bottles.

Preferably, the detergents and cleaning agents of the invention are pulverulent or tablet-shaped solids, in particular powders.

The detergents and cleaning agents according to the invention, in addition to components a) and b) may contain in principle all ingredients known and commonly used in such agents.

The detergents and cleaning agents according to the invention, in particular the agents for cleaning of dishes, may contain in particular builders, enzymes, alkali carriers, surface-active agents, pH regulators, organic solvents and other excipients, such as glass corrosion inhibitors, silver corrosion inhibitors and foam regulators.

Preferred detergents and cleaning agents are pulverulent and contain (i) 15 to 65 wt.-%, preferably 20 to 60 wt.-% of water-soluble builder,
(ii) 5 to 20 wt.-%, preferably 8 to wt.-%, of component a),
(iii) 0.5 to 6 wt.-% of co-granule b), and
(iv) 0 to 50 wt.-% of other additives, in particular enzymes, alkali carriers, surface-active agents, pH regulators, organic solvents or other additives, such as glass corrosion inhibitors, silver corrosion inhibitors and foam regulators, each based on the total weight of the detergent and cleaning agent.

Such an agent is in particular of low alkalinity, i.e. its 1 wt.-% solution has a pH in the range of 8 to 11.5 and preferably from 9 to 11.

As water-soluble builders in the detergents and cleaning agents according to the invention, in principle all builders used in such agents are to be considered. Examples of these are alkali phosphates, which may be present in the form of their alkaline, neutral or acidic sodium or potassium salts, in particular trisodium phosphate, tetrasodium diphosphate, disodium dihydrogen diphosphate, pentasodium triphosphate, so-called sodium hexametaphosphate as well as the corresponding potassium salts or mixtures of sodium and potassium salts. Their quantities can range from 15 to about 65 wt.-%, preferably from 20 to 60 wt.-%, relative to the total agent. Other possible water-soluble builders are besides polyphosphonates and phosphonate alkylcarboxylates, for example organic polymers of native or synthetic origin of the polycarboxylate type, which act as co-builders especially in hard water regions. To be considered, for example, are polyacrylic acids and copolymers from maleic acid anhydride and acrylic acid as well as the sodium salts of these polymer acids. Commercially available products include Sokalan® CP 5, CP 10 and PA 30 from BASF. The polymers of native origin that can be used as co-builders include, for example, oxidized starch and polyamino acids such as polyglutamic acid or polyasparagic acid. Other possible water-soluble builder components are naturally occurring hydroxycarboxylic acids such as monohydroxy-, dihydroxy succinic acid, alpha-hydroxypropionic acid and gluconic acid. Among the preferred organic water-soluble builder components are the salts of citric acid, in particular sodium citrate. Anhydrous trisodium citrate and preferably trisodium citrate dihydrate are considered as sodium citrate. Trisodium citrate dihydrate can be used as a fine or coarse crystalline powder. Depending on the pH value ultimately set in the detergents and cleaning agents of the invention, in particular the agents for the cleaning of dishes, the acids corresponding to said co-builder salts may also be present. Particularly preferred builder components in phosphate-free formulations are methylglycine diacetate (MDGA, e.g. Trilon® M, BASF), L-glutamic acid, N,N-(biscarboxymethyl)-tetra sodium salt (GLDA, Dissolvine® DL, Akzo Nobel), sodium polyaspartate (Baypure®, Lanxess) or salts of iminodisuccinic acid (Baypure®, Lanxess).

Among the enzymes optionally contained in the detergents and cleaning agents of the invention are proteases, amylases, pullulanases, cutinases and/or lipases, for example proteases such as BLAP™, Optimase™, Opticlean™, Maxacal™, Maxapem™, Durazym™, Purafect™ OxP, EXCELLENZ™ P 1250, Esperase™ and/or Savinase™, amylases such as Termamyl™, Amylase-LT™, Maxamyl™, Duramyl™ and/or lipases such as Lipolase™, Lipomax™, Lumafast™ und/oder Lipozym™. The enzymes used may be adsorbed on carriers and/or embedded in coating substances to protect them against premature inactivation. They are usually contained in the detergents and cleaning agents of the invention in quantities from 0 to 10 wt.-% and preferably in amounts between 0.05 and 5 wt.-%, wherein in particular enzymes stabilized against oxidative degradation are used.

Preferably, the detergents and cleaning agents of the invention contain the usual alkali carriers, such as for example alkali silicates, alkali carbonates and/or alkali hydrogen carbonates. The commonly used alkali carriers include carbonates, hydrogen carbonates and alkali silicates with a molar ratio of $SiO_2/M_2O$ (M=alkali atom) from 1:1 to 2.5:1. Alkali silicates can be used in amounts of up to 40 wt.-%, especially from 3 to 30 wt.-%, based on the total weight of the detergent and cleaning agent. The alkali carrier system preferably used in the detergents and cleaning agents of the invention is a mixture of carbonate and hydrogen carbonate, preferably sodium carbonate and sodium hydrogen carbonate, which may be contained in an amount of up to 50 wt.-% and preferably from 5 to 40 wt.-%.

In a further preferred embodiment of the invention the detergents and cleaning agents contain 20 to 60 wt.-% water-soluble organic builder, in particular alkali citrate, 3 to 20 wt.-% alkali carbonate and 3 to 40 wt.-% alkali disilicate.

The detergents and cleaning agents of the invention may optionally also include surfactants, in particular anionic surfactants, twitterionic surfactants and preferably weak foaming nonionic surfactants, which serve for better detachment of fatty contaminants, as a wetting agent and optionally in the context of the preparation of these agents as a granulating aid. Their amount can be up to 20 wt.-%, preferably up to 10 wt.-% and is particularly preferred in the range between 0.5 and 5 wt.-%, based on the total weight of the detergent and cleaning agent.

Usually extremely low-foaming compounds are used. These preferably include $C_{12}$-$C_{18}$-alkyl polyethyleneglycol polypropyleneglycol ethers with each up to 8 moles of ethylene oxide and propylene oxide units in the molecule. However, it is also possible to use other known low-foaming nonionic surfactants, such as $C_{12}$-$C_{18}$ alkyl polyethyleneglycol polybutyleneglycol ethers with each up to 8 moles of ethylene oxide and butylene oxide units in the molecule, endgroup-chapped alkyl polyalkyleneglycol-mixed ethers as well as the foaming but ecologically attractive $C_8$-$C_{14}$-alkyl polyglucosides with a degree of polymerization of about 1 to 4 and/or $C_{12}$-$C_{14}$-alkyl polyethyleneglycols with 3 to 8 ethylene oxide units in the molecule. Also suitable are surfactants from the family of glucamides, such as alkyl-N-methyl-glucamides, in which the alkyl part preferably is derived from a fatty alcohol with the C-chain length $C_6$-$C_{14}$. It is partially advantageous when the described surfactants are used as mixtures, for example, the combination alkylpolyglycoside with fatty alcohol ethoxylates or glucamide with alkyl polyglycosides. The presence of amine oxides, betaines and ethoxylated alkylamines is also possible.

For setting a desired pH-value which does not self-result from mixing the other components, the detergents and cleaning agents of the invention can contain system- and environmentally compatible acids, in particular citric acid, acetic acid, tartaric acid, malic acid, lactic acid, glycolic acid, succinic acid, glutaric acid and/or adipic acid, but also mineral acids, in particular sulfuric acid or alkali hydrogen sulfates, or bases, in particular ammonium or alkali hydroxides. Such pH regulators are contained in the detergents and cleaning agents of the invention preferably in an amount of not more than 10 wt.-% and particularly preferred from 0.5 to 6 wt.-%, each based on the total weight of the agent.

The organic solvents applicable in the detergents and cleaning agents of the invention contain alcohols with 1 to 4 C atoms, in particular methanol, ethanol, isopropanol and tert. butanol, diols with 2 to 4 C atoms, in particular ethylene glycol and propylene glycol, as well as their mixtures and ethers that can be derived from said compound classes. Such water-miscible solvents are preferably present in the detergents and cleaning agents of the invention in a quantity not above 20 wt.-% and especially preferred from 1 to 15 wt.-%.

If the detergents and cleaning agents of the invention, for example in the presence of anionic surfactants, foam too excessive during use, there can still be added up to 6 wt.-%, preferably about 0.5 to 4 wt-% of a foam-suppressing compound, preferably selected from the group of silicone oils, mixtures of silicone oil and hydrophobic silica, paraffins, paraffin-alcohol combinations, hydrophobic silica, bis-fatty acid amides, and other known and commercially available defoamers.

The detergents and cleaning agents of the invention may contain as further ingredients, for example, sequestration agents, electrolytes, additional peroxygen activators, dyes or fragrances, such as .B. perfume oils, known from the prior art for such agents.

The preparation of the solid or pulverulent detergents or cleaning agents of the invention offers no difficulties and can in principle be carried out in a known manner, for example by spray drying or by granulation, wherein peroxygen compound a) and co-granule b) optionally may be added later separately.

Detergents and cleaning agents of the invention in the form of aqueous or other common solvent-containing solutions can be produced particularly advantageously by simple mixing the ingredients, which can be added in substance or as a solution into an automatic mixer.

The detergents and cleaning agents of the invention are preferably available as pulverulent, granular or tablet-shaped preparations, which can be prepared in a known manner, for example, by mixing, granulating, roll compacting and/or by spray drying of thermally resilient components and by adding the more sensitive components, which comprise in particular enzymes, bleaching agents and the bleach catalyst.

For the preparation of detergents and cleaning agents of the invention in tablet form, one preferably proceeds in such a manner that all components are mixed with each other in a mixer and the mixture is pressed with pressures in the range of $200 \times 10^5$ Pa to $1500 \times 10^5$ Pa by means of conventional tablet presses, for example eccentric presses or rotary presses.

One thus obtains easily break-resistant and yet under the intended operating conditions sufficiently quickly soluble tablets with flexural strengths of normally more than 150 N. Preferably, a tablet prepared in this manner has a weight of 15 to 40 g, in particular from 20 to 30 g, with a diameter of 35 to 40 mm.

The manufacture of detergents and cleaning agents of the invention in the form of non-dusting, storage-stable free-flowing powders and/or granules with high bulk densities in the range of 800 to 1,000 g/l can be carried out by mixing in a first process stage the builder components with at least a proportion of liquid mixture components by increasing the bulk density of this premixture and subsequently—if desired after an intermediate drying—the further components of the agent, including peroxygen compound a) and co-granule b), are combined with the thus obtained premixture.

Detergents and cleaning agents of the invention can be used for hand washing as well as in household washing machines as well as in commercial washing machines. The addition can be performed by hand or by means of suitable dosing devices. The application concentrations in the cleaning liquor are usually about 1 to 8 g/l, preferably 2 to 5 g/l.

The invention also relates to a method for washing textiles or for cleaning surfaces, in which a washing liquor is acting on the textiles or the surfaces, which washing liquor has been prepared by adding a detergent or cleaning agent containing the above defined components a) and b) into water.

Detergents and cleaning agents of the invention containing components a) and b) can be advantageously used at low temperatures and show excellent washing and cleaning results at temperatures of less than 35° C., preferably of less than 30° C. and most preferably of less than 25° C. In addition, these detergents and cleaning agents show an excellent germ-killing effect even at low temperatures. The number of bacteria and yeasts on the substrates treated with them is significantly reduced by these agents.

Preferred is a process in which the aqueous solution is allowed to act on the textiles or the surfaces at temperatures of less than 30° C.

Further, the invention relates to the use of a detergent or cleaning agent containing the components a) and b) described above for disinfecting textiles or surfaces.

Finally, the invention relates to the use of the detergent or cleaning agent described above for washing textiles or for cleaning surfaces at temperatures of less than 30° C.

EXAMPLES

In the following examples indications of % means % by weight (wt.-%), unless explicitly stated otherwise.

Examples 1 and V1 to V2: Production of Co-Granules

In an intensive mixer from Eirich, Hardheim, the individual components of the compositions were mixed together and wet granulated with the aid of water. The carboxymethylcellulose swells by adding water and adsorbs the other ingredients. After drying, a solid bridge is formed and thus sufficient strength of the co-granule develops. Quantities and constituents of the compositions of the single examples are indicated in Table 1 below.

TABLE 1

Composition of the co-granules of Examples 1 and V1

| Example No. | 1 | V1 |
|---|---|---|
| 3-methyl-1,2-benzisothiazol-1,1-dioxide (wt.-%) | 33.3 | 33.3 |
| TAED (wt.-%) | 60.3 | 60.3 |
| carboxymethylcellulose (%)[1] | 6.4 | — |
| microcristalline cellulose (wt.-%)[2] | — | 6.4 |

[1]FinnFix BD
[2]Vivapur 200

From the formulation of example 1 co-granules could be produced by wet granulation.

From the formulation of example V1 no stable co-granules could be produced by wet granulation. The co-granules were not stable, but fell apart.

The co-granules produced according to Example 1 were then coated with a coating in a fluidized bed coating device of Glatt.

The co-granule according to Example 2 received a coating of 10 wt.-% hydroxy-methylcellulose (Tylose® MH 50 G4). The composition of the coated co-granule of Example 2 was 54.3 wt.-% TAED, 5.7 wt.-% carboxymethylcellulose, 30 wt.-% 3-methyl-1,2-benzisothiazole-1,1-dioxide and 10 wt.-% hydroxymethylcellulose.

The co-granule according to example V2 received a coating of 10 wt.-% of polyvinyl alcohol (PovalC, 6-88 from Kuraray). The composition of the coated co-granule of example V2 was 54.3 wt.-% TAED, 5.7 wt.-% carboxymethyl cellulose, 30 wt.-% 3-methyl-1,2-benzisothiazole-1,1-dioxide and 10 wt.-% polyvinyl alcohol.

Application Examples—Storage Tests

In order to check the chemical and physical stability of the coated co-granules according to Examples 2 and V2, their storing behaviour was investigated in a commercially available Vanish® formulation from Germany. For this purpose, 0.5 wt.-% of these co-granules were incorporated into the Vanish® powder mixture. The mixture was transferred to a glass bottle and stored at 40° C. for 3 months with the lid closed. Afterwards, it was visually assessed whether the co-granule had changed color to yellow.

The co-granules of Example 2 with hydroxymethylcellulose as a coating had not changed during storage and showed no yellowing.

The co-granules of example V2 with polyvinyl alcohol as a coating had changed during storage and showed a clear yellowing.

Application Examples—Washing Tests

Before and after storage, Lini tests were performed on BC-1 tee staining at 40° C. washing temperature using the Vanish® powder mixtures described above. 200 ml cups were filled with 1 BC-1 cloth rag from CFT B.V. (Center for Test Materials), which was soiled with tea. Afterwards, 150 ml of water with a water hardness of 15 dH and 1.044 g of the powder mixture were added. The cups were shaken after closing 30 min in the water bath at 40° C. After drying, the cloth rags were surveyed with a reflectometer of Elephro. The difference of the reflection at 457 nm between the unwashed sample and the washed sample was indicated as ΔR.

The bleaching performance of the powder mixture containing the co-granule of Example 2 was equally the same before and after storage.

Freshly prepared sample ΔR=19

Sample stored for 3 months at 40° C. ΔR=18

Application Examples—Hygiene Tests

To check the antimicrobial effect, various detergent formulations were investigated. For this purpose, 10 wt.-% sodium percarbonate and optionally other additives were incorporated into IEC-A basic detergent. The composition of the individual detergent formulations is given in Table 2 below.

TABLE 2

| | Detergent formulations | | | | |
|---|---|---|---|---|---|
| Example No. | IEC-base-detergent (wt-%) | sodium-per-carbonate (wt.-%) | TEAD (wt-%) | 3-methyl-1,2-benzisothiazol-1,1-dioxide (wt.-%) | sodium-sulfate (wt.-%) |
| V3 | 77 | 10 | — | — | 13 |
| V4 | 77 | 10 | 3 | — | 10 |
| 3 | 77 | 10 | 3 | 0.3 | 9.7 |
| 4 | 77 | 10 | 0.5 | 0.3 | 12.2 |

Quantitative suspension tests were carried out with these formulations in accordance with DIN EN 1040 (bacteria) and DIN EN 1275 (fungi). The exposure time was 15 minutes at 20° C. each. The results are shown in Table 3 below.

| organism | detergent of example V3 | detergent of example V4 | detergent of example 3 | detergent of example 4 |
|---|---|---|---|---|
| *Escherichia coli* ATCC 8739 | <1.34 | >5.72 | >5.72 | >5.72 |
| *Enterococcus faecalis* ATCC 19433 | >5.20 | >5.20 | >5.20 | >5.20 |
| *Staphylococcus aureus* ATCC 6538 | 2.21 | 2.67 | >5.24 | >5.24 |
| *Pseudomonas aeruginosa* ATCC 15442 | <0.75 | >5.12 | >5.12 | >5.12 |
| *Candida albicans* ATCC 10231 | 0.09 | 0.10 | 0.62 | 0.18 |
| *Trichophyton rubrum* DSM 19240 | 0.52 | 0.67 | >4.04 | 2.35 |

The cyclic sulfonimine requires TAED and percarbonate to be activated via peracetic acid. If no or too little TAED is supplied, the cyclic sulfonimine cannot be activated and cause bleaching effects at 20° C. and cannot be microbiologically effective.

If peracetic acid is formed from percarbonate and TAED (example V4), then at 20° C. *Escherichia coli*, *Enterococcus faecalis* and *Pseudomonas aeruginosa* are killed. If cyclic sulfonimine (examples 3 and 4) is added to this detergent, then *Staphylococcus aureus* and *Trichophyton rubrum* are also killed. This shows that the activated cyclic sulfonimine is also able to kill microbes at 20° C. in addition to the increased formation of peracetic acid.

The invention claimed is:

1. Co-granules consisting of:
   a) cellulose ether coating
   b1) cyclic sulfonimine,
   b2) bleach activator selected from the group consisting of tetraacetylethylenediamine, decanoyloxybenzoic acid or mixtures thereof, and
   b3) cellulose ether as binder,
   wherein the cellulose ether of component b3) has a solubility of at least 1 g of cellulose ether in 1 L of water at 25° C.,
   characterized in that the cyclic sulfonimine b1) is a compound of formula I

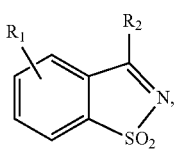

(I)

wherein $R_1$ and $R_2$ independently of one another are hydrogen, $C_1$-$C_6$-alkyl or phenyl.

2. Co-granules according to claim 1, characterized in that as bleach activator b2) tetraacetylethylene diamine is used.

3. Detergents and cleaning agents comprising
   a) bleaching agent selected from the group consisting of perborate, percarbonate or mixtures thereof, and
   b) co-granule coated with cellulose ether according to claim 2.

4. Co-granules according to claim 1, characterized in that $R_1$ is hydrogen and $R_2$ is $C_1$-$C_6$-alkyl or phenyl.

5. Detergents and cleaning agents comprising
   a) bleaching agent selected from the group consisting of perborate, percarbonate or mixtures thereof, and
   b) co-granule coated with cellulose ether according to claim 4.

6. Co-granules according to claim 1, characterized in that the binder b3) is a carboxymethylcellulose.

7. Detergents and cleaning agents comprising
   a) bleaching agent selected from the group consisting of perborate, percarbonate or mixtures thereof, and
   b) co-granule coated with cellulose ether according to claim 6.

8. Co-granules according to claim 1, characterized in that the cogranules are coated with methylcellulose.

9. Detergents and cleaning agents comprising
   a) bleaching agent selected from the group consisting of perborate, percarbonate or mixtures thereof, and
   b) co-granule coated with cellulose ether according to claim 8.

10. Detergents and cleaning agents comprising
    a) bleaching agent selected from the group consisting of perborate, percarbonate or mixtures thereof, and
    b) co-granule coated with cellulose ether according to claim 1.

11. Detergents and cleaning agents according to claim 10, characterized in that the bleaching agent a) is sodium percarbonate.

12. Detergents and cleaning agents according to claim 10, characterized in that these are available as pulverulent- or tablet-shaped solids, or as powders.

13. A method for washing textiles or for cleaning of surfaces, characterized in that a washing liquor is applied to the textiles or surfaces, which has been prepared by adding the detergent and cleaning agent according to claim 10 into water.

14. The method according to claim 13, characterized in that the aqueous solution is allowed to act on the textiles or the surfaces at temperatures of less than 30° C.

15. A method for disinfection of textiles or surfaces comprising utilizing a detergent or cleaning agent according claim 10.

16. A method for washing textiles or for cleaning surfaces comprising utilizing a detergent or cleaning agent according to claim 10.

* * * * *